(12) United States Patent
Kingsford

(10) Patent No.: US 11,042,161 B2
(45) Date of Patent: Jun. 22, 2021

(54) NAVIGATION CONTROL METHOD AND APPARATUS IN A MOBILE AUTOMATION SYSTEM

(71) Applicant: SYMBOL TECHNOLOGIES, LLC, Lincolnshire, IL (US)

(72) Inventor: Thomas D. Kingsford, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 132 days.

(21) Appl. No.: 16/344,306

(22) PCT Filed: Oct. 2, 2017

(86) PCT No.: PCT/US2017/059648
§ 371 (c)(1),
(2) Date: Apr. 23, 2019

(87) PCT Pub. No.: WO2018/093570
PCT Pub. Date: May 24, 2018

(65) Prior Publication Data
US 2019/0271984 A1    Sep. 5, 2019

Related U.S. Application Data

(60) Provisional application No. 62/423,077, filed on Nov. 16, 2016.

(51) Int. Cl.
*G05D 1/02*    (2020.01)
*B65G 1/04*    (2006.01)
(Continued)

(52) U.S. Cl.
CPC ......... *G05D 1/0212* (2013.01); *B65G 1/0492* (2013.01); *B65G 1/065* (2013.01);
(Continued)

(58) Field of Classification Search
CPC ......... G05D 2201/0216; G05D 1/0212; G01C 21/3407
See application file for complete search history.

(56) References Cited

U.S. PATENT DOCUMENTS 5,209,712 A    5/1993    Ferri
5,214,615 A    5/1993    Bauer
(Continued)

FOREIGN PATENT DOCUMENTS

CA    2835830    11/2012
CA    3028156    1/2018
(Continued)

OTHER PUBLICATIONS

Notice of allowance for U.S. Appl. No. 15/211,103 dated Apr. 5, 2017.
(Continued)

*Primary Examiner* — Thomas Randazzo

(57) ABSTRACT

A control method in a mobile automation apparatus includes: storing a plurality of parametric path definition identifiers and respective corresponding sub-region identifiers identifying sub-regions in a facility; receiving a task command containing (i) a task identifier, and (ii) a target one of the sub-region identifiers identifying a target one of the sub-regions; retrieving a selected one of the parametric path definition identifiers corresponding to the target sub-region identifier; obtaining a selected one of a plurality of parametric path definitions—including a shape parameter and a reference parameter name—corresponding to the selected parametric path definition identifier; obtaining a reference parameter value, and generating a sequence of mobile automation apparatus poses according to the parametric path definition; each pose corresponding to a location in the facility; and controlling a locomotive assembly of the
(Continued)

mobile automation apparatus to traverse the target sub-region according to the sequence of poses.

20 Claims, 6 Drawing Sheets

(51) Int. Cl.
| | |
|---|---|
| *B65G 1/06* | (2006.01) |
| *G05B 19/418* | (2006.01) |
| *B66F 9/06* | (2006.01) |
| *G01C 21/34* | (2006.01) |
| *B65G 1/137* | (2006.01) |
| *G01C 21/20* | (2006.01) |
| *G06Q 50/28* | (2012.01) |

(52) U.S. Cl.
CPC .............. *B65G 1/137* (2013.01); *B66F 9/063* (2013.01); *G01C 21/206* (2013.01); *G01C 21/3407* (2013.01); *G05B 19/41895* (2013.01); *G05D 2201/0207* (2013.01); *G05D 2201/0216* (2013.01); *G06Q 50/28* (2013.01)

(56) References Cited

U.S. PATENT DOCUMENTS

| | | | |
|---|---|---|---|
| 5,408,322 A | | 4/1995 | Hsu et al. |
| 5,414,268 A | | 5/1995 | McGee |
| 5,534,762 A | | 7/1996 | Kim |
| 5,566,280 A | | 10/1996 | Fukui et al. |
| 5,612,883 A | * | 3/1997 | Shaffer ................ G05D 1/0242 |
| | | | 701/300 |
| 5,953,055 A | | 9/1999 | Huang et al. |
| 5,988,862 A | | 11/1999 | Kacyra et al. |
| 6,026,376 A | | 2/2000 | Kenney |
| 6,034,379 A | | 3/2000 | Bunte et al. |
| 6,075,905 A | | 6/2000 | Herman et al. |
| 6,115,114 A | | 9/2000 | Berg et al. |
| 6,141,293 A | | 10/2000 | Amorai-Moriya et al. |
| 6,246,957 B1 | * | 6/2001 | Barrer .................... G01C 21/20 |
| | | | 701/467 |
| 6,304,855 B1 | | 10/2001 | Burke |
| 6,442,507 B1 | | 8/2002 | Skidmore et al. |
| 6,549,825 B2 | | 4/2003 | Kurata |
| 6,580,441 B2 | | 6/2003 | Schileru-Key |
| 6,711,293 B1 | | 3/2004 | Lowe |
| 6,721,769 B1 | | 4/2004 | Rappaport et al. |
| 6,836,567 B1 | | 12/2004 | Silver et al. |
| 6,995,762 B1 | | 2/2006 | Pavlidis et al. |
| 7,090,135 B2 | | 8/2006 | Patel |
| 7,137,207 B2 | | 11/2006 | Armstrong et al. |
| 7,245,558 B2 | | 7/2007 | Willins et al. |
| 7,248,754 B2 | | 7/2007 | Cato |
| 7,277,187 B2 | | 10/2007 | Smith et al. |
| 7,373,722 B2 | | 5/2008 | Cooper et al. |
| 7,474,389 B2 | | 1/2009 | Greenberg et al. |
| 7,487,595 B2 | | 2/2009 | Armstrong et al. |
| 7,493,336 B2 | | 2/2009 | Noonan |
| 7,508,794 B2 | | 3/2009 | Feather et al. |
| 7,527,205 B2 | | 5/2009 | Zhu et al. |
| 7,605,817 B2 | | 10/2009 | Zhang et al. |
| 7,647,752 B2 | | 1/2010 | Magnell |
| 7,693,757 B2 | | 4/2010 | Zimmerman |
| 7,726,575 B2 | | 6/2010 | Wang et al. |
| 7,751,928 B1 | | 7/2010 | Antony et al. |
| 7,783,383 B2 | | 8/2010 | Eliuk et al. |
| 7,839,531 B2 | | 11/2010 | Sugiyama |
| 7,845,560 B2 | | 12/2010 | Emanuel et al. |
| 7,885,865 B2 | | 2/2011 | Benson et al. |
| 7,925,114 B2 | | 4/2011 | Mai et al. |
| 7,957,998 B2 | | 6/2011 | Riley et al. |
| 7,996,179 B2 | | 8/2011 | Lee et al. |
| 8,009,864 B2 | | 8/2011 | Linaker et al. |
| 8,049,621 B1 | | 11/2011 | Egan |
| 8,091,782 B2 | | 1/2012 | Cato et al. |
| 8,094,902 B2 | | 1/2012 | Crandall et al. |
| 8,094,937 B2 | | 1/2012 | Teoh et al. |
| 8,132,728 B2 | | 3/2012 | Dwinell et al. |
| 8,134,717 B2 | | 3/2012 | Pangrazio et al. |
| 8,189,855 B2 | | 5/2012 | Opalach et al. |
| 8,199,977 B2 | | 6/2012 | Krishnaswamy et al. |
| 8,207,964 B1 | | 6/2012 | Meadow et al. |
| 8,233,055 B2 | | 7/2012 | Matsunaga et al. |
| 8,265,895 B2 | | 9/2012 | Willins et al. |
| 8,277,396 B2 | | 10/2012 | Scott et al. |
| 8,284,988 B2 | | 10/2012 | Sones et al. |
| 8,423,431 B1 | | 4/2013 | Rouaix et al. |
| 8,429,004 B2 | | 4/2013 | Hamilton et al. |
| 8,463,079 B2 | | 6/2013 | Ackley et al. |
| 8,479,996 B2 | | 7/2013 | Barkan et al. |
| 8,520,067 B2 | | 8/2013 | Ersue |
| 8,542,252 B2 | | 9/2013 | Perez et al. |
| 8,571,314 B2 | | 10/2013 | Tao et al. |
| 8,599,303 B2 | | 12/2013 | Stettner |
| 8,630,924 B2 | | 1/2014 | Groenevelt et al. |
| 8,660,338 B2 | | 2/2014 | Ma et al. |
| 8,743,176 B2 | | 6/2014 | Stettner et al. |
| 8,757,479 B2 | | 6/2014 | Clark et al. |
| 8,812,226 B2 | | 8/2014 | Zeng |
| 8,923,893 B2 | | 12/2014 | Austin et al. |
| 8,930,058 B1 | * | 1/2015 | Quist .................. G05D 1/0221 |
| | | | 701/23 |
| 8,939,369 B2 | | 1/2015 | Olmstead et al. |
| 8,954,188 B2 | | 2/2015 | Sullivan et al. |
| 8,958,911 B2 | | 2/2015 | Wong et al. |
| 8,971,637 B1 | | 3/2015 | Rivard |
| 8,989,342 B2 | | 3/2015 | Liesenfelt et al. |
| 9,007,601 B2 | | 4/2015 | Steffey et al. |
| 9,037,287 B1 | | 5/2015 | Grauberger et al. |
| 9,064,394 B1 | | 6/2015 | Trundle |
| 9,070,285 B1 | | 6/2015 | Ramu et al. |
| 9,129,277 B2 | | 9/2015 | Macintosh |
| 9,135,491 B2 | | 9/2015 | Morandi et al. |
| 9,159,047 B2 | | 10/2015 | Winkel |
| 9,171,442 B2 | | 10/2015 | Clements |
| 9,247,211 B2 | | 1/2016 | Zhang et al. |
| 9,329,269 B2 | | 5/2016 | Zeng |
| 9,349,076 B1 | | 5/2016 | Liu et al. |
| 9,367,831 B1 | | 6/2016 | Besehanic |
| 9,380,222 B2 | | 6/2016 | Clayton et al. |
| 9,396,554 B2 | | 7/2016 | Williams et al. |
| 9,400,170 B2 | | 7/2016 | Steffey |
| 9,424,482 B2 | | 8/2016 | Patel et al. |
| 9,517,767 B1 | | 12/2016 | Kentley et al. |
| 9,542,746 B2 | | 1/2017 | Wu et al. |
| 9,549,125 B1 | | 1/2017 | Goyal et al. |
| 9,562,971 B2 | | 2/2017 | Shenkar et al. |
| 9,565,400 B1 | | 2/2017 | Curlander et al. |
| 9,589,353 B2 | | 3/2017 | Mueller-Fischer et al. |
| 9,600,731 B2 | | 3/2017 | Yasunaga et al. |
| 9,600,892 B2 | | 3/2017 | Patel et al. |
| 9,612,123 B1 | | 4/2017 | Levinson et al. |
| 9,639,935 B1 | | 5/2017 | Douady-Pleven et al. |
| 9,645,577 B1 | * | 5/2017 | Frazzoli .......... B60W 30/18163 |
| 9,697,429 B2 | | 7/2017 | Patel et al. |
| 9,766,074 B2 | | 9/2017 | Roumeliotis et al. |
| 9,778,388 B1 | | 10/2017 | Connor |
| 9,791,862 B1 | | 10/2017 | Connor |
| 9,805,240 B1 | | 10/2017 | Zheng et al. |
| 9,811,754 B2 | | 11/2017 | Schwartz |
| 9,827,683 B1 | | 11/2017 | Hance et al. |
| 9,880,009 B2 | | 1/2018 | Bell |
| 9,928,708 B2 | | 3/2018 | Lin et al. |
| 9,953,420 B2 | | 4/2018 | Wolski et al. |
| 9,980,009 B2 | | 5/2018 | Jiang et al. |
| 9,994,339 B2 | | 6/2018 | Colson et al. |
| 9,996,818 B1 | | 6/2018 | Ren et al. |
| 10,019,803 B2 | | 7/2018 | Venable et al. |
| 10,111,646 B2 | | 10/2018 | Nycz et al. |
| 10,121,072 B1 | | 11/2018 | Kekatpure |
| 10,127,438 B1 | | 11/2018 | Fisher et al. |
| 10,197,400 B2 | | 2/2019 | Jesudason et al. |
| 10,210,603 B2 | | 2/2019 | Venable et al. |

(56) References Cited

U.S. PATENT DOCUMENTS

| | | | |
|---|---|---|---|
| 10,229,386 B2 | 3/2019 | Thomas | |
| 10,248,653 B2 | 4/2019 | Blassin et al. | |
| 10,265,871 B2 | 4/2019 | Hance et al. | |
| 10,289,990 B2 | 5/2019 | Rizzolo et al. | |
| 10,336,543 B1 | 7/2019 | Sills et al. | |
| 10,349,031 B2 | 7/2019 | Deluca | |
| 10,352,689 B2 | 7/2019 | Brown et al. | |
| 10,373,116 B2 | 8/2019 | Medina et al. | |
| 10,394,244 B2 | 8/2019 | Song et al. | |
| 10,473,470 B2 * | 11/2019 | Iagnemma | G01C 21/30 |
| 2001/0031069 A1 | 10/2001 | Kondo et al. | |
| 2001/0041948 A1 | 11/2001 | Ross et al. | |
| 2002/0006231 A1 | 1/2002 | Jayant et al. | |
| 2002/0097439 A1 | 7/2002 | Braica | |
| 2002/0146170 A1 | 10/2002 | Rom | |
| 2002/0158453 A1 | 10/2002 | Levine | |
| 2002/0164236 A1 | 11/2002 | Fukuhara et al. | |
| 2003/0003925 A1 | 1/2003 | Suzuki | |
| 2003/0094494 A1 | 5/2003 | Blanford et al. | |
| 2003/0174891 A1 | 9/2003 | Wenzel et al. | |
| 2004/0021313 A1 | 2/2004 | Gardner et al. | |
| 2004/0131278 A1 | 7/2004 | imagawa et al. | |
| 2004/0240754 A1 | 12/2004 | Smith et al. | |
| 2005/0016004 A1 | 1/2005 | Armstrong et al. | |
| 2005/0114059 A1 | 5/2005 | Chang et al. | |
| 2005/0213082 A1 | 9/2005 | DiBernardo et al. | |
| 2005/0213109 A1 | 9/2005 | Schell et al. | |
| 2006/0032915 A1 | 2/2006 | Schwartz | |
| 2006/0045325 A1 | 3/2006 | Zavadsky et al. | |
| 2006/0106742 A1 | 5/2006 | Bochicchio et al. | |
| 2006/0285486 A1 | 12/2006 | Roberts et al. | |
| 2007/0036398 A1 | 2/2007 | Chen | |
| 2007/0074410 A1 | 4/2007 | Armstrong et al. | |
| 2007/0219720 A1 * | 9/2007 | Trepagnier | G05D 1/0278 701/300 |
| 2007/0272732 A1 | 11/2007 | Hindmon | |
| 2008/0002866 A1 | 1/2008 | Fujiwara | |
| 2008/0025565 A1 | 1/2008 | Zhang et al. | |
| 2008/0027591 A1 | 1/2008 | Lenser et al. | |
| 2008/0077511 A1 | 3/2008 | Zimmerman | |
| 2008/0159634 A1 | 7/2008 | Sharma et al. | |
| 2008/0164310 A1 | 7/2008 | Dupuy et al. | |
| 2008/0175513 A1 | 7/2008 | Lai et al. | |
| 2008/0181529 A1 | 7/2008 | Michel et al. | |
| 2008/0238919 A1 | 10/2008 | Pack | |
| 2008/0294487 A1 | 11/2008 | Nasser | |
| 2009/0009123 A1 | 1/2009 | Skaff | |
| 2009/0024353 A1 | 1/2009 | Lee et al. | |
| 2009/0057411 A1 | 3/2009 | Madej et al. | |
| 2009/0059270 A1 | 3/2009 | Opalach et al. | |
| 2009/0060349 A1 | 3/2009 | Linaker et al. | |
| 2009/0063306 A1 | 3/2009 | Fano et al. | |
| 2009/0063307 A1 | 3/2009 | Groenovelt et al. | |
| 2009/0074303 A1 | 3/2009 | Filimonova et al. | |
| 2009/0088975 A1 | 4/2009 | Sato et al. | |
| 2009/0103773 A1 | 4/2009 | Wheeler et al. | |
| 2009/0125350 A1 | 5/2009 | Lessing et al. | |
| 2009/0125535 A1 | 5/2009 | Basso et al. | |
| 2009/0152391 A1 | 6/2009 | McWhirk | |
| 2009/0160975 A1 | 6/2009 | Kwan | |
| 2009/0192921 A1 | 7/2009 | Hicks | |
| 2009/0206161 A1 | 8/2009 | Olmstead | |
| 2009/0236155 A1 | 9/2009 | Skaff | |
| 2009/0252437 A1 | 10/2009 | Li et al. | |
| 2009/0287587 A1 | 11/2009 | Bloebaum et al. | |
| 2009/0323121 A1 | 12/2009 | Valkenburg et al. | |
| 2010/0017407 A1 | 1/2010 | Beniyama et al. | |
| 2010/0026804 A1 | 2/2010 | Tanizaki et al. | |
| 2010/0070365 A1 | 3/2010 | Siotia et al. | |
| 2010/0082194 A1 | 4/2010 | Yabushita et al. | |
| 2010/0091094 A1 | 4/2010 | Sekowski | |
| 2010/0106356 A1 * | 4/2010 | Trepagnier | G08G 1/16 701/25 |
| 2010/0118116 A1 | 5/2010 | Tomasz et al. | |
| 2010/0131234 A1 | 5/2010 | Stewart et al. | |
| 2010/0141806 A1 | 6/2010 | Uemura et al. | |
| 2010/0171826 A1 | 7/2010 | Hamilton et al. | |
| 2010/0208039 A1 | 8/2010 | Setettner | |
| 2010/0214873 A1 | 8/2010 | Somasundaram et al. | |
| 2010/0235033 A1 | 9/2010 | Yamamoto et al. | |
| 2010/0241289 A1 | 9/2010 | Sandberg | |
| 2010/0295850 A1 | 11/2010 | Katz et al. | |
| 2010/0315412 A1 | 12/2010 | Sinha et al. | |
| 2010/0326939 A1 | 12/2010 | Clark et al. | |
| 2011/0047636 A1 | 2/2011 | Stachon et al. | |
| 2011/0052043 A1 | 3/2011 | Hyung et al. | |
| 2011/0093306 A1 | 4/2011 | Nielsen et al. | |
| 2011/0137527 A1 | 6/2011 | Simon et al. | |
| 2011/0144828 A1 * | 6/2011 | Chengalva | F41H 7/005 701/2 |
| 2011/0168774 A1 | 7/2011 | Magal | |
| 2011/0172875 A1 | 7/2011 | Gibbs | |
| 2011/0216063 A1 | 9/2011 | Hayes | |
| 2011/0242286 A1 | 10/2011 | Pace et al. | |
| 2011/0254840 A1 | 10/2011 | Halstead | |
| 2011/0286007 A1 | 11/2011 | Pangrazio et al. | |
| 2011/0288816 A1 | 11/2011 | Thierman | |
| 2011/0310088 A1 | 12/2011 | Adabala et al. | |
| 2012/0019393 A1 | 1/2012 | Wolinsky et al. | |
| 2012/0022913 A1 | 1/2012 | Volkmann et al. | |
| 2012/0051730 A1 | 3/2012 | Cote et al. | |
| 2012/0069051 A1 | 3/2012 | Hagbi et al. | |
| 2012/0075342 A1 | 3/2012 | Choubassi et al. | |
| 2012/0133639 A1 | 5/2012 | Kopf et al. | |
| 2012/0307108 A1 | 6/2012 | Forutanpour | |
| 2012/0169530 A1 | 7/2012 | Padmanabhan et al. | |
| 2012/0179322 A1 * | 7/2012 | Hennessy | G05D 1/0278 701/25 |
| 2012/0179621 A1 | 7/2012 | Moir et al. | |
| 2012/0185112 A1 | 7/2012 | Sung et al. | |
| 2012/0194644 A1 | 8/2012 | Newcombe et al. | |
| 2012/0197464 A1 | 8/2012 | Wang et al. | |
| 2012/0201466 A1 | 8/2012 | Funayama et al. | |
| 2012/0209553 A1 | 8/2012 | Doytchinov et al. | |
| 2012/0236119 A1 | 9/2012 | Rhee et al. | |
| 2012/0249802 A1 | 10/2012 | Taylor | |
| 2012/0250978 A1 | 10/2012 | Taylor | |
| 2012/0269383 A1 | 10/2012 | Bobbitt et al. | |
| 2012/0287249 A1 | 11/2012 | Choo et al. | |
| 2012/0323620 A1 | 12/2012 | Hofman et al. | |
| 2013/0030700 A1 | 1/2013 | Miller et al. | |
| 2013/0090881 A1 | 4/2013 | Janardhanan et al. | |
| 2013/0119138 A1 | 5/2013 | Winkel | |
| 2013/0132913 A1 | 5/2013 | Fu et al. | |
| 2013/0134178 A1 | 5/2013 | Lu | |
| 2013/0138246 A1 | 5/2013 | Gutmann et al. | |
| 2013/0142421 A1 | 6/2013 | Silver et al. | |
| 2013/0144565 A1 | 6/2013 | Miller | |
| 2013/0154802 A1 | 6/2013 | O'Haire et al. | |
| 2013/0156292 A1 | 6/2013 | Chang et al. | |
| 2013/0162806 A1 | 6/2013 | Ding et al. | |
| 2013/0176398 A1 | 7/2013 | Bonner et al. | |
| 2013/0178227 A1 | 7/2013 | Vartanian et al. | |
| 2013/0182114 A1 | 7/2013 | Zhang et al. | |
| 2013/0226344 A1 | 8/2013 | Wong et al. | |
| 2013/0228620 A1 | 9/2013 | Ahem et al. | |
| 2013/0235165 A1 | 9/2013 | Gharib et al. | |
| 2013/0236089 A1 | 9/2013 | Litvak et al. | |
| 2013/0278631 A1 | 10/2013 | Border et al. | |
| 2013/0299306 A1 | 11/2013 | Jiang et al. | |
| 2013/0299313 A1 | 11/2013 | Baek, IV et al. | |
| 2013/0300729 A1 | 11/2013 | Grimaud | |
| 2013/0303193 A1 | 11/2013 | Dharwada et al. | |
| 2013/0321418 A1 | 12/2013 | Kirk | |
| 2013/0329013 A1 | 12/2013 | Metois et al. | |
| 2013/0341400 A1 | 12/2013 | Lancaster-Larocque | |
| 2014/0002597 A1 | 1/2014 | Taguchi et al. | |
| 2014/0003655 A1 | 1/2014 | Gopalkrishnan et al. | |
| 2014/0003727 A1 | 1/2014 | Lortz et al. | |
| 2014/0016832 A1 | 1/2014 | Kong et al. | |
| 2014/0019311 A1 | 1/2014 | Tanaka | |
| 2014/0025201 A1 | 1/2014 | Ryu et al. | |
| 2014/0028837 A1 | 1/2014 | Gao et al. | |
| 2014/0047342 A1 | 2/2014 | Breternitz et al. | |

(56) References Cited

U.S. PATENT DOCUMENTS

| | | |
|---|---|---|
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0309920 A1* | 10/2014 | Ricci .............. G06F 3/0637 701/400 |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Fang et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyayskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0025849 A1* | 1/2019 | Dean .............. H04N 5/23212 |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |

(56) References Cited

FOREIGN PATENT DOCUMENTS

| | | |
|---|---|---|
| EP | 2693362 | 2/2014 |
| GB | 2323238 | 9/1998 |
| GB | 2330265 | 4/1999 |
| KR | 101234798 | 1/2009 |
| KR | 102019003143 1 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
International Search Report and Written Opinion for International Patent Application No. PCT/US2017/059648 dated Mar. 12, 2018.
Kelly et al., "Reactive Nonholonomic Trajectory Generation via Parametric Optimal Control", International Journal of Robotics Research, vol. 22, No. 7-8, pp. 583-601 (Jul. 30, 2013).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).

(56) References Cited

OTHER PUBLICATIONS

International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n. 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

(56) References Cited

OTHER PUBLICATIONS

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

\* cited by examiner

NAVIGATION CONTROL METHOD AND APPARATUS IN A MOBILE AUTOMATION SYSTEM

CROSS-REFERENCE TO RELATED APPLICATIONS

This application claims priority from U.S. Provisional Patent Application No. 62/423,077, filed Nov. 16, 2016, which is incorporated herein by reference in its entirety.

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. The travel of the mobile apparatus through the environment to perform such data capture operations is subject to various requirements, which may conflict with each other. For example, the above-mentioned environments may be complex and contain various obstacles, including customers, requiring the mobile apparatus to repeatedly generate updated paths. Conventional cost-based path generation mechanisms are computationally costly, and may therefore require the mobile apparatus to interrupt the data capture task to await generation of a new path when an obstacle is detected.

Further, a data capture operation may require the mobile apparatus to implement certain constraints throughout the operation, such as remaining within a certain distance of a structure in the environment. The mobile apparatus' perception of such constraints may also vary during execution of the operation, necessitating updating or regeneration of the path the mobile apparatus will travel. Conventional path generation mechanisms are poorly suited to navigation under such dynamic conditions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
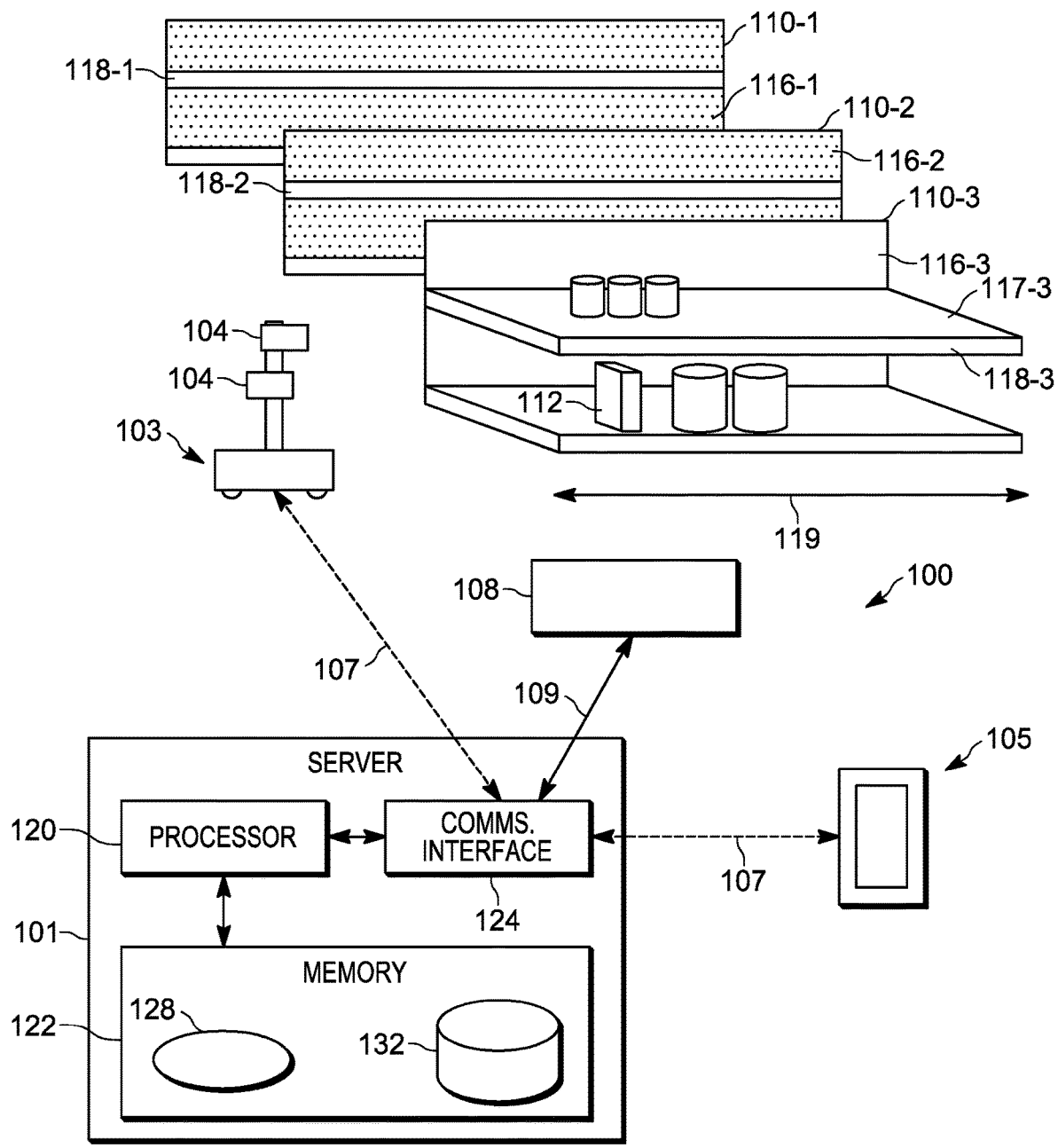
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a control method in a mobile automation apparatus including: storing a plurality of parametric path definition identifiers and respective corresponding sub-region identifiers identifying sub-regions in a facility; receiving a task command containing (i) a task identifier, and (ii) a target one of the sub-region identifiers identifying a target one of the sub-regions; retrieving a selected one of the parametric path definition identifiers corresponding to the target sub-region identifier; obtaining a selected one of a plurality of parametric path definitions—including a shape parameter and a reference parameter name—corresponding to the selected parametric path definition identifier; obtaining a reference parameter value, and generating a sequence of mobile automation apparatus poses according to the parametric path definition; each pose corresponding to a location in the facility; and controlling a locomotive assembly of the mobile automation apparatus to traverse the target sub-region according to the sequence of poses.

Further examples disclosed herein are directed to a computing device for controlling in a mobile automation apparatus, comprising: a memory storing a plurality of parametric path definition identifiers and respective corresponding sub-region identifiers identifying sub-regions in a facility; a task manager configured to receive a task command containing (i) a task identifier, and (ii) a target one of the sub-region identifiers identifying a target one of the sub-regions; a navigation controller configured to retrieve, from the memory, a selected one of the parametric path definition identifiers that corresponds to the target sub-region identifier; a parametric path generator configured to obtain a selected one of a plurality of parametric path definitions that corresponds to the selected parametric path definition identifier; the selected parametric path definition including a shape parameter and a reference parameter name; the parametric path generator further configured to obtain a reference parameter value corresponding to the reference parameter name, and generate a sequence of mobile automation apparatus poses according to the parametric path definition; each pose corresponding to a location in the facility; and a local planner configured to control a locomotive assembly of the mobile automation apparatus to traverse the target sub-region according to the sequence of poses.

FIG. 1 depicts a mobile automation system 100 in accordance with the teachings of this disclosure. The system 100 includes a control server 101 (also referred to herein simply as the server 101), in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks (WANs) such as the Internet, mobile networks, and the like. The system 100 also includes a dock 108 for the apparatus 103. The dock 108 is in communication with the server 101 via a link 109 that in the present example is a wired link. In other examples, however, the link 109 is a wireless link. The mobile automation apparatus 103, when coupled to the dock 108, may establish communications with the dock 108 to communicate with the server 101 via the link 109 instead of, or in addition to, the link 107. The dock 108 may also supply power (e.g. electrical power) to the apparatus 103.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 may also, in some examples, include other support structures, such as pegs, hangers and the like. The shelf modules 110 are typically arranged in a plurality of aisles, each of which includes a plurality of modules aligned end-to-end. In such arrangements, the shelf edges 118 face into the aisles, through which customers in the retail environment, as well as the apparatus 103, may travel. The aisles occupy regions of the retail environment, and the shelf modules 110 occupy sub-regions within the above-mentioned regions. The aisles and shelf modules 110 are therefore also referred to herein as regions and sub-regions of the facility (e.g. the above-mentioned retail environment), respectively. Other structures within the environment in which the system 100 is deployed may also occupy such regions and sub-regions instead of the aisles of shelf modules 110.

The apparatus 103 is deployed within the retail environment, and communicates with the server 101 (e.g., via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, and the like), and is further configured to employ the sensors to capture shelf data. In the present example, the apparatus 103 is configured to receive instructions from the server 101 to perform one or more tasks, such as a data capture task, respective to one or more shelf modules 110. The apparatus 103 is configured, responsive to such instructions, to navigate among the relevant shelf modules 110 and perform the specified task, for example by capturing images of the shelf modules 110 for delivery to the server 101.

The server 101 includes a special purpose controller, such as a processor 120, specifically designed to control the mobile automation apparatus 103 to perform tasks respective to the shelf modules 110 (such as the above-mentioned capture of images). To that end, the server 101 stores, in a memory 122 interconnected with the processor 120, identifiers of regions and sub-regions (e.g. identifiers of shelf modules 110), and may also store operational constraints associated with the shelf modules 110. The processor 120 is configured to provide instructions to the apparatus 103, via a communications interface 124, to perform tasks such as the above-mentioned data capture, and to receive the captured data or other results of the tasks for storage in a repository 132 in the memory 122. The server 101 is also, in some examples, configured to perform various post-processing activities on captured data, for example to determine product status data (e.g. out of stock or low stock products) and to transmit status notifications to the mobile device 105 responsive to the determination of product status data.

The processor 120 and the memory 122 each comprise one or more integrated circuits. In an embodiment, the processor 120 includes one or more central processing units (CPUs) and/or graphics processing units (GPUs). The memory 122 is a non-transitory computer readable storage medium having stored thereon computer readable instructions for executing control of the apparatus 103, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). In an embodiment, a specially designed integrated circuit, such as a Field Programmable Gate Array (FPGA), is designed to perform the functionality discussed herein, either alternatively or in addition to the processor 120 and memory 122. As those of skill in the art will realize, the client device 105 also includes one or more controllers or processors and/or FPGAs, in communication with the processor 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The applications stored in the memory 122 include a control application 128, which may also be implemented as a suite of logically distinct applications, and whose execution by the processor 120 configures the processor 120 to implement various functionality. As will now be apparent, some or all of the functionality implemented by the processor 120 may also be performed by preconfigured hardware elements (e.g. one or more Application-Specific Integrated Circuits (ASICs)) rather than by execution of the control application 128 by the processor 120. In the present example, in particular, the server 101 is configured via the execution of the control application 128 by the processor 120, to issue instructions (also referred to herein as commands) to the apparatus 103 to cause the apparatus 103 to perform one or more specified tasks in the retail environment.

Figure 2A:
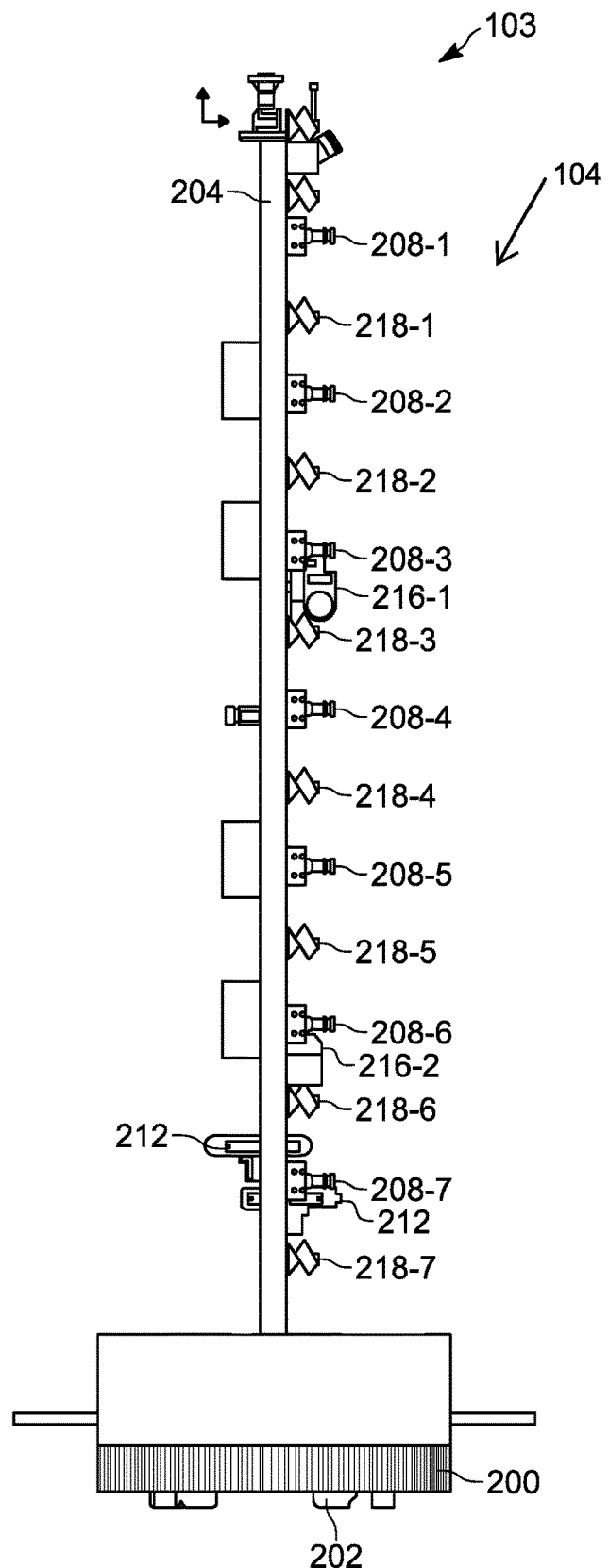
FIG. 2A depicts a mobile automation apparatus in the system of FIG. 1.
Figure 2B:
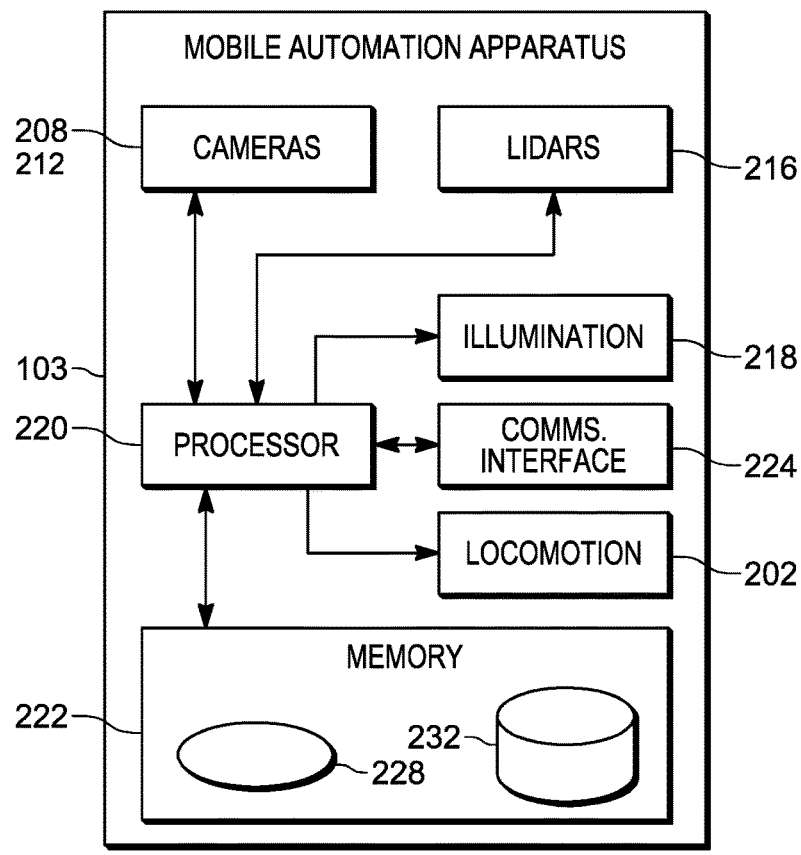
FIG. 2B is a block diagram of certain internal hardware components of the mobile automation apparatus in the system of FIG. 1.

Turning now to FIGS. 2A and 2B, the apparatus 103 will be described in greater detail. The apparatus 103 includes a chassis 200 containing a locomotive assembly 202 (e.g. one or more electric motors driving wheels, tracks or the like). In one embodiment, a special-purpose controller, such as a processor 220 (which may also be, in some examples, an ASIC and/or FPGA) configured to control navigational and/or data capture aspects of the apparatus 103 is also housed within the chassis 200. The controller 220 may control the locomotive assembly 202 to move the apparatus 103, for example via the execution of computer-readable instructions such as a task execution application 228 stored in a memory 222 interconnected with the processor 220. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The application 228 may also be implemented as a suite of distinct applications, and such applications may be implemented as a combination of computer-readable instructions and/or preconfigured hardware elements such as ASICs and FPGAs.

As will be described below, the execution of the application 228 by the controller 220 configures the apparatus 103 to receive instructions from the server 101 and, responsive to the instructions, perform tasks (such as the above-mentioned data capture) respective to shelf modules 110 identified in the instructions. In particular, to perform the above-mentioned tasks, the processor 220 is configured to generate and update navigational data, such as a path along which the apparatus 103 travels to perform the required task.

The memory 222 may also store a repository 232 containing, for example, a map of the environment in which the apparatus 103 operates, for use during the execution of the application 228. The repository 232 may also contain one or more of path definition identifiers and path definitions corresponding to the path definition identifiers, for use during the execution of the application 228 to generate path data. The apparatus 103 may communicate with the server 101, for example to receive the above-mentioned instructions, via a communications interface 224 over the link 107 shown in FIG. 1. The communications interface 224 also enables the apparatus 103 to communicate with the server 101 via the dock 108 and the link 109.

The apparatus 103 further includes a sensor mast 204 supported on the chassis 200 and, in the present example, extending upwards from the chassis 200. The mast 204 supports the sensors 104 mentioned earlier. In particular, the sensors 104 include at least one imaging sensor 208 such as a digital camera, as well as at least one depth-sensing sensor 212, such as a 3D digital camera. The apparatus 103 also includes additional depth sensors, such as LIDAR sensors 216, in the present example. The sensors 208, 212, 216 are oriented on the mast 204 such that the fields of view of each sensor face a shelf 110 along the length 119 of which the apparatus 103 is travelling. In other examples, the apparatus 103 includes additional sensors, such as one or more RFID readers, temperature sensors, and the like.

In the present example, the mast 204 supports seven digital cameras 208-1 through 208-7, and two LIDAR sensors 216-1 and 216-2. The mast 204 also supports a plurality of illumination assemblies 218, configured to illuminate the fields of view of the respective cameras 208. That is, the illumination assembly 218-1 illuminates the field of view of the camera 208-1, and so on. The sensors 208 and 216 are oriented on the mast 204 such that the fields of view of each sensor face a shelf 110 along the length 119 of which the apparatus 103 is travelling. The apparatus 103 is configured to track a location of the apparatus 103 (e.g. a location of the center of the chassis 200) in a frame of reference previously established in the retail facility.

Figure 3:
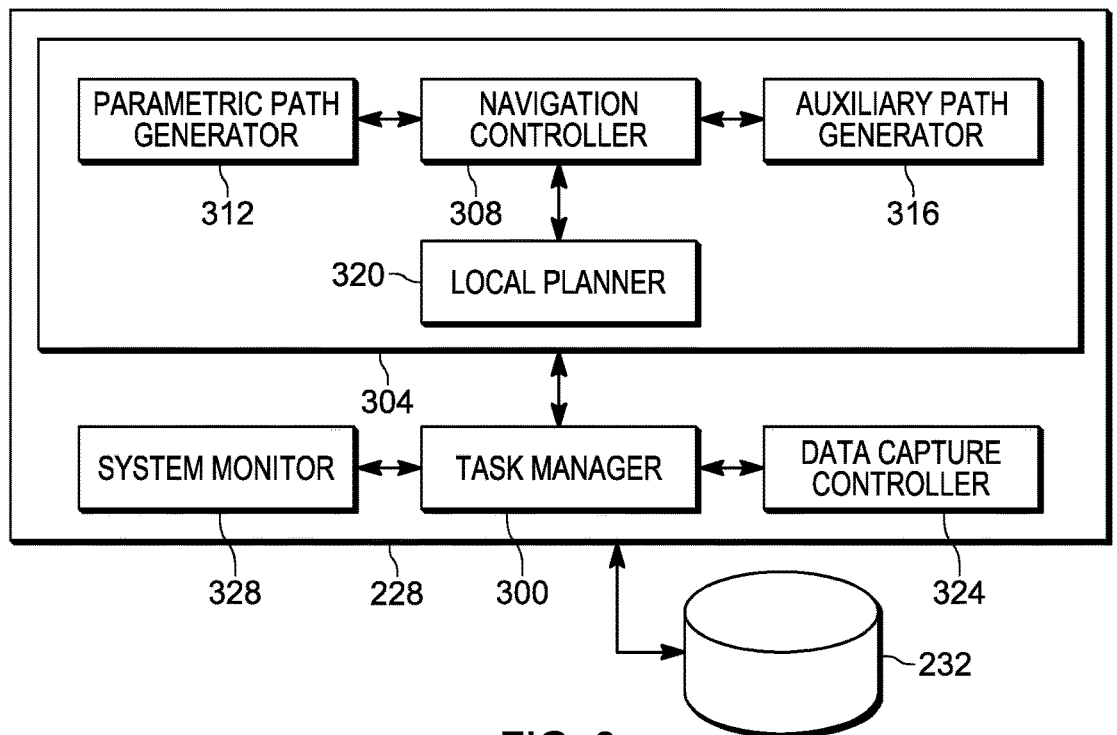
FIG. 3 is a block diagram of certain internal components of the mobile automation apparatus of the system of FIG. 1.

Turning now to FIG. 3, before describing the operation of the application 228 to execute (e.g., at the apparatus 103) task instructions, and particularly to generate navigation data for the execution of task instructions, certain components of the application 228 will be described in greater detail. As will be apparent to those skilled in the art, in other examples the components of the application 228 may be separated into distinct applications, or combined into other sets of components. Some or all of the components illustrated in FIG. 3 may also be implemented as dedicated hardware components, such as one or more ASICs or FPGAs.

The control application 228 includes a task manager 300 configured to receive instructions from the server 101 to perform tasks in the retail facility. The instructions received from the server typically include a task identifier (e.g., identifying the task as a data capture task), an identifier of a target sub-region in the retail facility (e.g., one or more aisle identifiers, or one or more module identifiers). The task manager 300 is configured to control the other components of the application 228 in executing the task. For example, the task manager 300 is configured in an embodiment to pass the sub-region identifier from the instruction to a navigator 304 of the application 228.

The navigator 304 is configured to generate paths through the retail facility traversing the shelf modules 110 identified in the instructions received from the server 101 (via the task manager 300), and to control the locomotive assembly 202 to carry the apparatus 103 along the above-mentioned paths. As will be discussed in greater detail below, under certain conditions the navigator 304 is configured to generate the above paths independently of the previously-mentioned facility map stored in the repository 232, through the use of parametric path definitions.

Specifically, the navigator 304 includes a navigation controller 308, a parametric path generator 312, an auxiliary path generator 316, and a local planner 320. The local planner 320 is configured to receive a sequence of poses from the navigation controller 308, and to control the locomotive assembly 202 to carry the apparatus 103 along the sequence of poses, based in part on the above-mentioned map stored in the repository 232 (e.g. to verify that the sequence of poses is not intersected by any obstacles). The sequence of poses, in other words, define a path along which the apparatus 103 travels. Each pose is represented as at a set of coordinates in the frame of reference defined for the facility, according to which the apparatus 103 tracks its location and defines the map in the repository 232.

The parametric path generator 312 and the auxiliary path generator 316 are each configured to generate sequences of poses responsive to instructions from the navigation controller 308. The navigation controller 308 selects which sequence of poses (i.e. that from the parametric path generator 312 or that from the auxiliary path generator 316) to transmit to the local planner 320 for execution. Of particular note, the parametric path generator 312 is configured to generate each sequence of poses not by implementing conventional cost-based path generation techniques based on the environmental map in the repository 232, but rather by identifying, retrieving and processing a parametric path definition, as will be described below in greater detail.

The other components of the application 228 also include a data capture controller 324 configured to control the sensors 104 (e.g. the image sensors 208 and the depth sensors 212) to capture data such as images of the shelves 110 while the apparatus 103 travels along the paths generated by the navigator 304. The application 228 also includes a system monitor 328 configured to monitor the status of the apparatus 103. For example, the system monitor 328 can be configured to monitor a remaining energy capacity (e.g. fuel, battery level or the like) of the apparatus 103, a safety sensor (e.g. a safety lidar sensor configured to detect obstacles in the path of the apparatus 103), or the like. The system monitor 328 is configured to generate and provide alerts to the task manager 300 under certain conditions to interrupt task execution.

Figure 4:
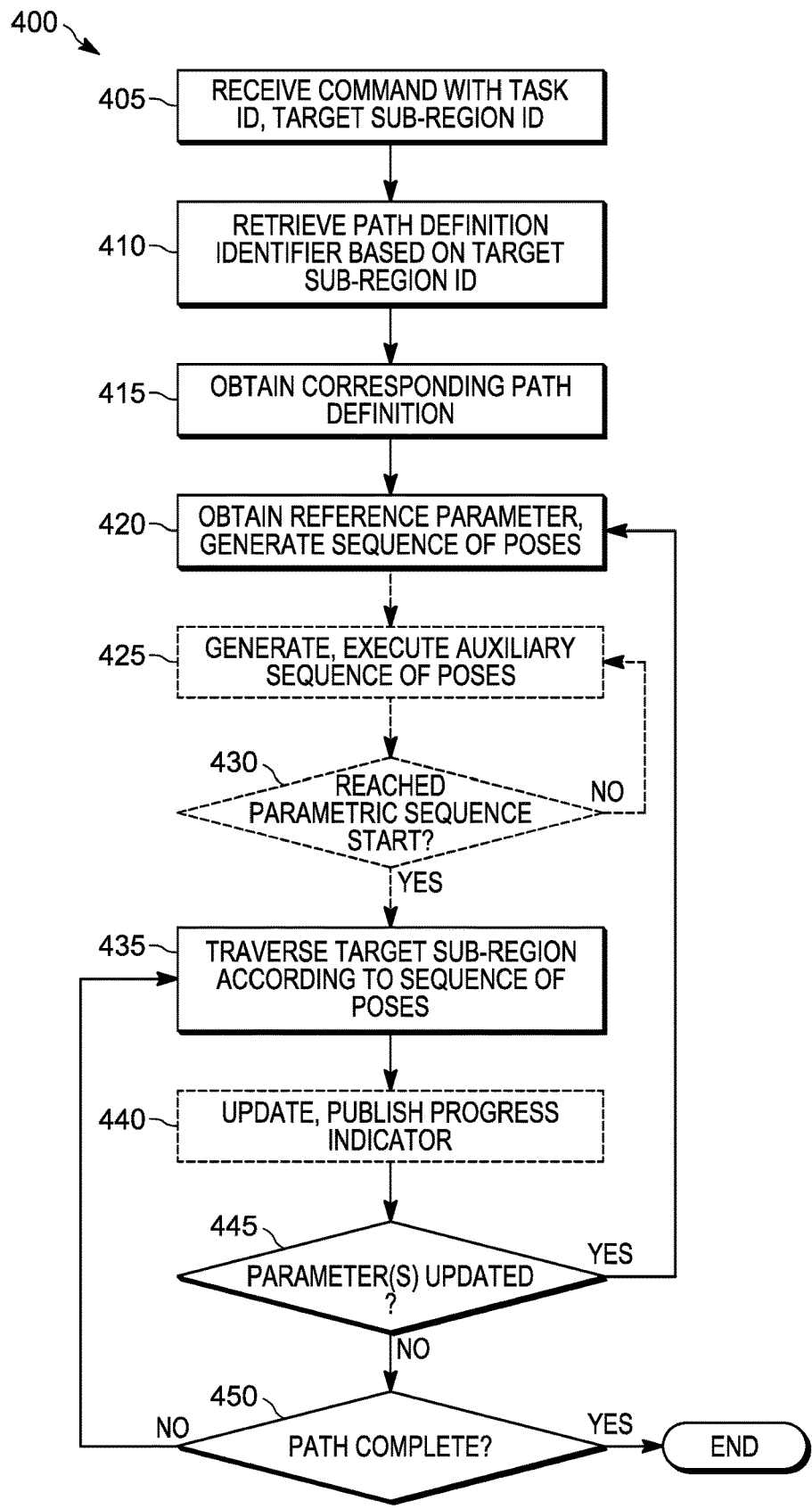
FIG. 4 is a flowchart of a control method at the server of the system of FIG. 1.

The functionality of the application 228 will now be described in greater detail, with reference to the components illustrated in FIG. 3. Turning first to FIG. 4, a method 400 of generating and executing navigational data for the apparatus 103 is shown. The method 400 will be described in conjunction with its performance by the apparatus 103 as described above.

At block 405, the apparatus 103 is configured to receive a task command including at least a task identifier and an identifier of at least one target sub-region of the facility. The task command may be received, for example, from the server 101 (which may, in turn, have received a request from the client device 105 to transmit the task command) via the link 107. The task command is received at the processor 220 via the communications interface 124. More specifically, the task manager 300 is configured to receive the task command via the execution of the application 228 by the processor 220.

The task identifier is selected at the server 101, and indicates a task to be performed by the apparatus 103 in the facility. In the present example, the task identifier is assumed to identify a data capture task, indicating that the apparatus 103 is to traverse the target sub-regions identified in the task command and to capture data (e.g. images, depth measurements and the like) during the traverse. In other performances of the method 400, the task may be, for example, a guidance task, e.g. to guide a patron in the facility to a particular location. In embodiments in which only a single task is implemented, the task identifier may be omitted from the task command.

The target sub-region identifier(s) included in the task command identify one or more sub-regions of the facility. In the present example, therefore, each target sub-region identifier identifies a shelf module 110 in the facility. The task command received at block 405 can identify the target sub-region(s) explicitly (that is, by individual sub-region identifiers), or implicitly via a region identifier, such as the identifier of an aisle or department (containing a plurality of aisles) in the facility.

Following receipt of the task command at block 405, the task manager is configured to provide the target sub-region identifier(s) to the navigator 304 for further processing. In some embodiments, the task command may also include imaging constraints (e.g., a number of frames per second at which to capture images). The task manager 300 may be configured to pass such parameters to the data capture controller 324; however, the handling and execution of data capture constraints is not central to the discussion below.

At block 410, the navigator 304, and particularly the navigation controller 308, is configured to receive the target sub-region identifier(s) from the task manager 300, and to retrieve one or more parametric path definition identifiers from the memory 222. To that end, the apparatus 103 stores, for example in the repository 232, a plurality of sub-region identifiers corresponding to each of the sub-regions in the facility (i.e. each of the modules 110 in the facility, in the present embodiment). For each sub-region identifier, the apparatus 103 also stores a corresponding parametric path definition identifier. Table 1 below illustrates the sub-region identifiers and corresponding parametric path definition identifiers stored in the memory 222.

TABLE 1

Sub-Region and Parametric Path Definition Identifiers

| Department | Aisle(s) | Module(s) | Parametric Path Definition ID |
|---|---|---|---|
| Grocery | 1 | 1-A-1-G | PPD1 |
|  | 2 | 2-A-2-G | PPD2 |
| ... | ... | ... | ... |

As seen above, the apparatus 103 may also store a region identifier corresponding to one or more sub-region identifiers, such as the "aisle" identifiers noted above. In some embodiments, the apparatus 103 also stores identifiers corresponding to supersets of regions, such as the "department" identifier above. Thus, as noted above, the task command received at block 405 can include sub-region identifiers, or in other embodiments can include an aisle or department identifier, from which the navigation controller 308 can retrieve the corresponding sub-region identifiers. In further embodiments, the task manager 300, rather than the navigation controller, performs any required translation from region to sub-region identifiers based on records such as those shown above, and the navigation controller 308 therefore receives only target sub-region identifiers.

As seen in Table 1, each parametric path definition identifier corresponds to a group of sub-regions. Thus, for example, the parametric path definition identifier corresponds to the module identifiers 1-A, 1-B, 1-C, 1-D, 1-E, 1-F and 1-G. In other examples, a different parametric path definition identifier may be stored in association with each individual sub-region identifier. Typically, a given parametric path definition identifier is stored in association with a contiguous set of sub-regions (that is, a set of modules 110 disposed end-to-end, with minimal or no space between the modules 110). In the examples discussed herein, the modules 1-A to 1-G are assumed to be contiguous, and the modules 2-A to 2-F are also assumed to be contiguous, but separate from the modules 1-A to 1-G.

Although Table 1 includes one parametric path definition identifier per group of sub-regions, in other examples, the apparatus 103 can store a plurality of parametric path definition identifiers for each group of sub-regions. For example, in another embodiment Table 1 can list distinct parametric path definition identifiers for each of a plurality of tasks for a given sub-region or group of sub-regions.

At block 410, therefore, the navigation controller 308 is configured to retrieve a selected one (or more, depending on which sub-regions were identified in the task command) of the parametric path definition identifiers from Table 1 corresponding to the target sub-regions identified in the task command. In the present example performance of method 400, it is assumed that the task command identified the modules 1-A to 1-G, and at block 410 the navigation controller 308 is therefore configured to retrieve (e.g., from Table 1) the parametric path definition identifier "PPD1". Having retrieved the parametric path definition identifier, the navigation controller 308 is configured to pass the selected parametric path definition identifier to the parametric path generator 312.

At block 415, the parametric path generator 312 is configured to obtain a selected one of a plurality of parametric path definitions that corresponds to the selected parametric path definition identifier. In the present embodiment, the parametric path generator 312 is configured to obtain the parametric path definition by retrieving the parametric path definition from the memory 222 (e.g., from the repository 232). The memory 222 therefore contains a plurality of parametric path definitions, each with a corresponding parametric path definition identifier.

In other embodiments, the parametric path definition and any or all of the associated data shown above (i.e. the initial values, constraints and progress indicator definition) are stored not in the memory 222, but in a storage location external to the apparatus 103. For example, in some embodiments the parametric path definitions are stored at the server 101 (e.g., in the repository 132). In such embodiments, at block 415 the parametric path generator 312 is configured to obtain the parametric path definition by transmitting a request (e.g., via the navigation controller 304, the task manager 300 and the communications interface 224) to the server 101 including the parametric path definition identifier retrieved at block 410.

Table 2, below, illustrates an example parametric path definition and associated data, as stored in the memory 222.

TABLE 2

Parametric Path Definitions

| Path Def. ID | Path Definition | Config. Values | Boundary Constraints | Progress Indicator |
|---|---|---|---|---|
| PPD1 | $X(\lambda) = 50 - [Dst] + [Dadj]$<br>$Y(\lambda) = 20\lambda + 10$<br>$Dadj = PID(Dm, Dst)$ | $\lambda_1 = 0$;<br>$\lambda_N = 1$<br>$N = 8$<br>$Dadj = 0$ | Dm-max = 70<br>Dm-min = 30 | $P = \lambda \times 100$ |
| ... | ... | ... | ... | ... |

As seen in Table 2, for each parametric path definition identifier, the memory 222 stores a parametric path definition. The parametric path definition, in general, defines a path within the facility, independently of the environmental map stored in the repository 132. The parametric path definition typically does not, however, define the path in absolute terms (i.e. as a path at a fixed location within the facility frame of reference). Rather, the parametric path definition includes one or more shape parameters defining the general shape of the path and, optionally, placing certain constraints on the location of the path. The parametric path definition also includes at least one reference parameter name. As will be discussed below, the reference parameter name permits the insertion of a reference parameter value that can be altered between performances of the method 400 or even during a given performance of the method 400, in order to alter the resulting path without requiring a different parametric path definition. The reference parameter(s) and the shape parameters may collectively be referred to as local parameters.

In the example of Table 2, the parametric path definition defines each of a plurality of poses, or locations, along the path in two dimensions (X and Y) in the facility frame of reference. The number and spacing of the poses along the path are defined by an independent parameter, $\lambda$. In the above example, each pose is defined in part by a first reference parameter named "Dst", and a second reference parameter named "Dadj". The first reference parameter, in the present example, corresponds to a target distance to the relevant shelf (that is, the shelf of the modules 1-A to 1-G). The second reference parameter named "Dadj", in the present example, is employed to adjust the position of the path during execution of the path based on an error between the target distance to shelf Dst and a measured distance to shelf Dm (e.g., obtained via the lidar sensors 216). In other words, the reference parameters define operational constraints relative to an object in the facility (in particular, a shelf module). The assignment of values to the reference parameters will be discussed in greater detail below.

Each pose is further defined by one or more shape parameters, for example in the form of exponents applied to the X and Y dimensions of the path. In the present example, all exponents in the path definition have values of one (and are therefore not explicitly shown in Table 2), indicating that the path forms a straight line (e.g., rather than a curve). The shape parameters also include, in the present example, parameters placing constraints on the location and length of the path. The parameters of the parametric path definition will be described below in greater detail in connection with an illustration of a resulting path.

As seen in Table 2, the memory 222 also stores, in conjunction with the parametric path definition, one or more configuration values. The configuration values include an initial value $\lambda_1$ for the independent parameter $\lambda$ mentioned above, as well as a final value $\lambda_N$ for the independent parameter, and a number N of steps through which the independent parameter is incremented from the initial value to the final value in order to generate the path. In the present example, the configuration value also includes a default value for the reference parameter Dadj. In further embodiments (not shown), the configuration values also include a default value for the Dst reference parameter.

The memory 222 also stores, in conjunction with the parametric path definition, one or more boundary constraints, which may also be referred to as global parameters. The global parameters define outer boundaries for, for example, values of a measured distance to shelf Dm. That is, if the measured distance Dm falls outside the range defined by the global parameters during execution of the path, the navigator 304 may be configured to abort execution of the path. In other embodiments, the boundary constraints may be omitted. Other boundary constraints can also be specified, including maximum speed of travel of the apparatus 103, as well as a maximum permissible deviation in an angle of orientation, $\theta$, of the apparatus 103.

The memory 222 further stores, in conjunction with the parametric path definition, a progress indicator definition. As will be discussed below, the progress indicator definition defines a measurement of progress made along the path by the apparatus 103 according to the independent parameter. In other embodiments, the progress indicator definition may be omitted.

In the present example performance of block 415, therefore, the parametric path generator 312 is configured to retrieve the parametric path definition having the identifier PPD1, as well as the associated configuration values, boundary constraints and progress indicator definition. At block 420, the parametric path generator 312 is configured to obtain values for the reference parameters in the parametric path definition, and to generate a sequence of poses (that is, to generate the path itself) according to the parametric path definition. The generation of the path (i.e., of the sequence of poses) will be discussed below in connection with FIG. 5.

Figure 5:
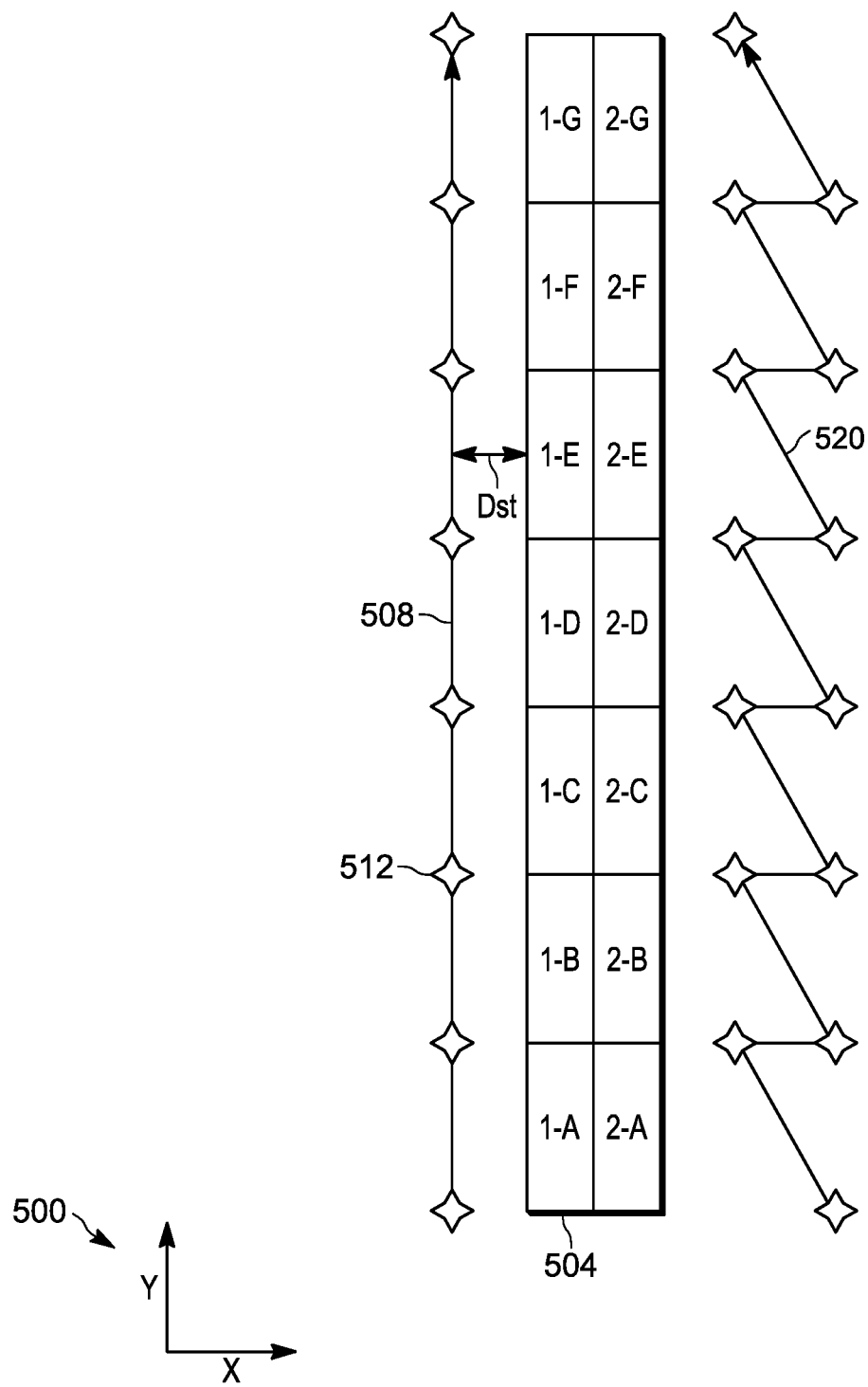
FIG. 5 depicts example parametric paths generated during the performance of the method of FIG. 4.

Turning to FIG. 5, the above-mentioned shelf modules 1-A to 1-G and 2-A to 2-G are illustrated from above. A two-dimensional frame of reference 500 is defined in the facility. The frame of reference 500 may also include a third dimension (i.e., height), however in the present example the apparatus 103 travels along the ground of the facility in two dimensions, and the third dimension is therefore omitted. It is assumed that an edge 504 of the modules 1-A to 1-G facing into the aisle is located at coordinates X=50 in the frame of reference 500 (that is, the shelf edge 504 is parallel to the Y axis). It is further assumed that the edge 504 travels from a first end at coordinates of (X=50, Y=10) (near the bottom of the page) to (X=50, Y=30) (near the top of the page). A target distance to shelf Dst is illustrated between the shelf edge 504 and a path 508 defined by the parametric path definition PPD1.

Values for the target distance to shelf Dst and the adjustment parameter Dadj, may be obtained at block 420 from the memory 222 (e.g. from the default values of Table 2) or from the task command received at block 405. In the present example performance of the method 400, a value for the target distance to shelf is received at block 405 from the server 101 and passed to the parametric path generator 312 by the navigation controller 304. The value of Dst is assumed to be 5, in the present example performance of block 415. A value for the adjustment parameter Dadj, meanwhile, is retrieved from the configuration values in Table 2 (the value is zero, in the present example).

Having obtained values for the reference parameters specified by the parametric path definition, the parametric path generator 312 is configured to generate a sequence of poses, each pose corresponding to a value of the independent parameter. In the present example, as seen from Table 2, eight poses 512 are generated, each defined at least by X and Y coordinates. Each pose may also be defined by an angle θ, indicating the angle the apparatus 103 faces at the given pose. Typically, the angle θ is determined as the direction between the current pose and the next pose in the sequence. As will also be apparent from Table 2, the first pose 512 has (X, Y) coordinates of (50, 10), while the last pose 512 has (X, Y) coordinates of (50, 30). The parameter Dadj has no impact on the sequence of poses at this point, as no measured distance to shelf values are yet available.

As also seen in FIG. 5, other parametric path definitions may define more complex paths, such as a path 520 having a sawtooth shape. The path 520 may be employed, for example, when the corresponding sub-regions (in the present example, the modules 2-A to 2-G) have reflective surfaces such as glass doors that are not suitable for imaging by the apparatus 103 unless the cameras 208 are at non-perpendicular angles to the doors. Such a path definition may include shape parameters imposing the sawtooth shape on the resulting path. The path definition may also include parameters (which may be fixed in the form of shape parameters, or variable in the form of reference parameters) defining the pitch of the sawtooth pattern, the amplitude of the wave, and the distance between the peaks of the wave and the modules 2-A to 2-G.

Returning to FIG. 4, the output of the parametric path generator at block 420 is shown below in Table 3, with the angle parameter θ omitted for simplicity (as the path 508 is a straight line)

TABLE 3

Sequence of Poses for Path 508

| λ | X | Y |
| --- | --- | --- |
| 0 | 45 | 10 |
| 0.143 | 45 | 12.857 |
| 0.286 | 45 | 15.714 |
| 0.423 | 45 | 18.571 |
| 0.571 | 45 | 21.429 |
| 0.714 | 45 | 24.286 |
| 0.857 | 45 | 27.143 |
| 1 | 45 | 30 |

Responsive to generating the sequence of poses at block 420, the parametric path generator 312 is configured to pass the sequence of poses to the navigation controller 308 for forwarding to the local planner 320. In some embodiments, following the performance of block 420, the navigation controller 308 is also configured, upon receiving the sequence of poses from the parametric path generator 312, to transmit at least a subset of the poses to the auxiliary path generator 316. In the present example, the first pose (i.e. the start of the parametric path 508) is transmitted to the auxiliary path generator 316.

At block 425, the auxiliary path generator 316 is configured to generate an auxiliary sequence of poses, beginning at a current location of the apparatus 103 and terminating at the first pose of the parametric path 508. In other words, the task of navigating to the start of the parametric path is typically left to the auxiliary path generator 316, which is configured to generate the auxiliary path based on conventional map and cost-based mechanisms.

At block 430, the navigation controller 308 is configured to execute the auxiliary path by sending the auxiliary poses to the local planner 320, and to determine whether a current location of the apparatus 103 matches the first pose of the parametric path generated at block 420. When the determination is negative, the execution of the auxiliary path continues at block 425. When the determination at block 430 is affirmative, the performance of the method 400 proceeds to block 435.

At block 435, the navigation controller 308 is configured to transmit the sequence of poses defining the parametric path 508 to the local planner for execution. The local planner 320, in turn, is configured to control the locomotive assembly 202 to traverse the sub-region(s) identified in the task command received at block 405 according to the poses of the parametric path 508. At block 440, the navigation controller 308 can be configured to update and publish a progress indicator according to the progress indicator definition shown in Table 2 (i.e. retrieved previously by the parametric path generator 312). Specifically, the local planner 320 is configured to report the arrival of the apparatus 103 at each pose of the path 508 to the navigation controller 308. The navigation controller 308, in turn, is configured to generate an updated progress indicator based on the most-recently received report from the local planner 320. In the present example, as will be apparent from Table 2, the progress indicator is a percentage based solely on the independent variable. Thus, for example, following arrival of the apparatus 103 at the third pose of the path 308, the progress indicator is 28.6%. A wide variety of other progress indicator definitions may also be employed.

The publication of the progress indicator can be achieved, for example, by saving the updated progress indicator to a register in the memory 222 that is accessible by other components (e.g. the task manager 300). In other embodiments, such other components may explicitly subscribe to the progress indicator, and the navigation controller 308 can store identifiers of such components and send the updated progress indicator to each component.

At block 440, the navigation controller 308 can also be configured to publish the independent parameter itself. For example, the currently active value of the independent parameter may be published (e.g. to a register or by transmission to subscribing components, as mentioned above in connection with the progress indicator).

At block 445, the navigation controller 308 is configured to monitor for updates to the reference parameters identified in the parametric path definition whose identifier was retrieved at block 415. For example, in the present example, the navigation controller 308 can be configured to determine whether an updated target distance to shelf Dst has been received (e.g. from the server 101). As a further example, the navigation controller 308 can be configured to monitor a measured distance to the shelf during execution of the path 508. The measured distance to the shelf may be obtained from the lidar sensors 216. As will be apparent to those skilled in the art, the measured distance to shelf Dm may not always match the target distance to shelf Dst, for example due to minor localization errors at the apparatus 103, or sensor errors in the lidar sensors 216. As a result of such errors, the trajectory taken by the apparatus 103 may deviate from the path 508. As will be discussed below, the nature of the parametric path definitions may permit the apparatus 103 to dynamically correct for such errors, without requiring computationally expensive cost-based path regeneration.

Figure 6:
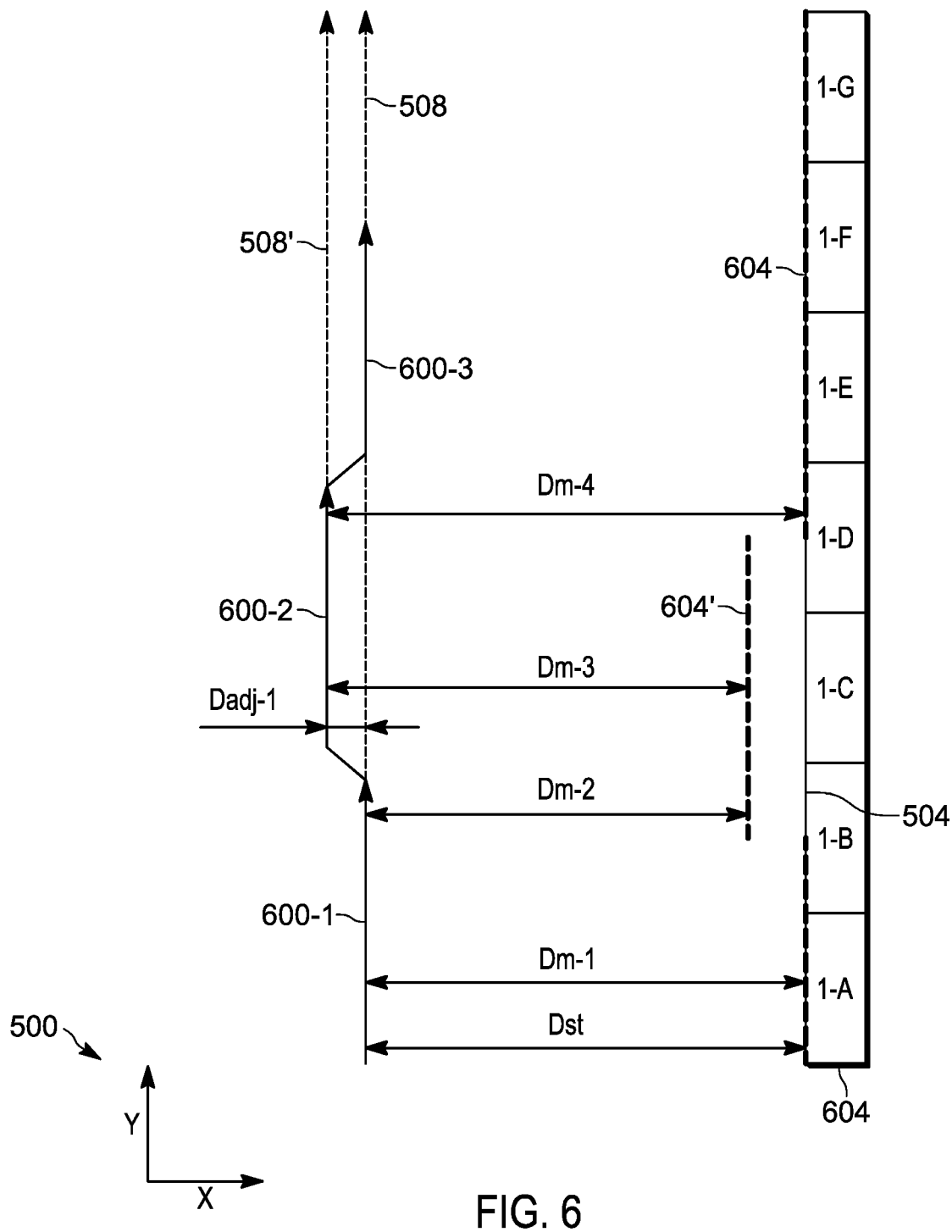
FIG. 6 depicts an example performance of the method of FIG. 4.

Turning to FIG. 6, the path 508 and the modules 1-A to 1-G are shown, along with the trajectory traveled by the apparatus 103 (which is overlaid in solid lines on the path 508, illustrated as a dashed line). In particular, in a first portion 600-1 of the trajectory follows the path 508, as the perceived shelf edge 604 (e.g., by the lidar sensors 216) aligns with the true shelf edge 504. The measured distance to shelf Dm-1 therefore matches the target distance Dst, and the adjustment parameter Dadj therefore remains at zero.

However, at a later point along the portion 600-1, the perceived shelf edge has shifted to a location 604' (e.g. due to sensor drift). As a result, the measured distance to shelf Dm-2 is smaller than Dst. As seen in Table 2, the navigation controller is configured to generate the adjustment parameter Dadj based on a difference between Dst and Dm. For example, the navigation controller 308 may implement a PID or other suitable digital controller to minimize the difference between Dm and Dst. In the present example, therefore, the difference between Dm-2 and Dst leads to the generation at the navigation controller of an adjustment parameter Dadj-1 at block 445. Following an affirmative determination at block 445, the navigation controller 308 returns to block 420 and causes the parametric path generator 312 to generate an updated sequence of poses based on the updated parameter. That is, in the present example, rather than employing the default value for Dadj at this instance of block 420, the parametric path generator 312 generates a new sequence of poses (beginning at the current value of λ rather than at the initial value of A) using the value of Dadj generated at block 445.

The updated path is shown at FIG. 6 as a parametric path 508'. The performance of blocks 435-445 is then repeated for the updated path 508', resulting in travel of the apparatus 103 along a second portion 600-2 of the trajectory, during which a measured distance to shelf Dm-3 matches the target distance to shelf Dst, and therefore during which no further changes are made to the adjustment parameter Dadj. Subsequently, the shelf edge as perceived by the lidar sensors 216 returns to the position 604, leading to an error between the measured distance Dm-4 and the target distance Dst. As a result, via further performances of block 445 and 420, the navigator 304 generates an updated adjustment parameter (which in the present example returns to zero) and a corresponding parametric path coincident with the original path 508. The remainder of the trajectory 600-3 follows the updated path.

Returning to FIG. 4, at block 450, following a negative determination at block 445, the navigation controller 308 is configured to determine whether execution of the current path is complete at block 450. When the path is not complete, the performance of method 400 returns to block 435. When the path is complete, however, performance of the method 400 ends. Following termination of the method 400, the navigator 304 may be configured to generate a further path (e.g. via the auxiliary path generator 316) to return to the dock 108.

As will now be apparent, a wide variety of other path configurations may also be implemented via parametric path definitions. In an embodiment, for example, a parametric path definition may include a further reference parameter, or set of reference parameters, in place of the shape parameter 50 of the definition PPD1 shown in Table 2. As will be apparent from FIGS. 5 and 6, the parameter 50 indicates the position of the shelf edge 504 in the frame of reference 500. Rather than employ a fixed position for the shelf edge 504, the parametric path definition may include a further reference parameter to which a value may be assigned (and therefore altered) that indicates the position of the shelf. Such a value may be received from the server at block 405 (e.g., in the form of a plane or line in the frame of reference 500 that contains the shelf edge 504), or generated at the apparatus 103 (e.g. via a shelf recognition function configured to detect the shelf from images captured by the cameras 208).

Further variations to the above path generation and execution are contemplated. For example, although the control method 400 is described above as being performed within the apparatus 103, in other embodiments, some or all of the blocks of the method 400 may be performed at the server 101 or the client device 105. That is, the blocks of the method 400, with the exception of the execution of commands by the locomotive assembly 202, may be performed by any other suitable computing device. Such a computing device includes the relevant ones of the components shown in FIG. 3.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A control method in a mobile automation apparatus, comprising:
storing, in a memory, a plurality of parametric path definition identifiers and respective corresponding sub-region identifiers identifying sub-regions in a facility;
receiving a task command containing (i) a task identifier, and (ii) a target one of the sub-region identifiers identifying a target one of the sub-regions;
retrieving, from the memory, a selected one of the parametric path definition identifiers that corresponds to the target sub-region identifier;
obtaining a selected one of a plurality of parametric path definitions that corresponds to the selected parametric path definition identifier, the selected parametric path definition including a shape parameter and a reference parameter name;
obtaining a reference parameter value corresponding to the reference parameter name, and generating a sequence of mobile automation apparatus poses according to the parametric path definition, each pose corresponding to a location in the facility; and
controlling a locomotive assembly of the mobile automation apparatus to traverse the target sub-region according to the sequence of poses.

2. The control method of claim 1, further comprising: storing the plurality of parametric path definitions in the memory; wherein obtaining the selected parametric path definition comprises retrieving the selected parametric path definition from the memory.

3. The control method of claim 1, wherein obtaining the selected parametric path definition comprises transmitting a request containing the selected parametric path definition identifier from the mobile automation apparatus to a control server; and receiving the selected parametric path definition responsive to the request.

4. The control method of claim 1, further comprising: monitoring for an updated reference parameter value; responsive to detecting the updated reference parameter value, generating an updated sequence of mobile automation apparatus poses according to the parametric path definition.

5. The control method of claim 1, further comprising: obtaining a selected one of a plurality of progress indicator definitions that corresponds to the selected parametric path definition identifier; and during the controlling of the locomotive assembly to traverse the target sub-region according to the sequence of poses, generating a progress indicator according to the selected progress indicator definition.

6. The control method of claim 1, further comprising, responsive to generating the sequence of mobile automation apparatus poses: obtaining a current location of the mobile automation apparatus; generating an auxiliary path from the current location to an initial one of the sequence of poses, according to a cost function; and prior to controlling the locomotive assembly to traverse the target sub-region, controlling the locomotion assembly to traverse the auxiliary path.

7. The control method of claim 1, wherein the reference parameter defines an operational constraint relative to an object in the target sub-region.

8. The control method of claim 7, wherein the object includes a shelf module, and wherein the reference parameter includes a distance to the shelf module.

9. The control method of claim 7, wherein obtaining the reference parameter value comprises: receiving sensor data at the mobile automation apparatus; and generating the reference parameter based on the sensor data.

10. The control method of claim 7, wherein obtaining the reference parameter value comprises receiving the reference parameter value in the task command.

11. A computing device for controlling navigation of a mobile automation apparatus, comprising:
a memory storing a plurality of parametric path definition identifiers and respective corresponding sub-region identifiers identifying sub-regions in a facility;
a task manager configured to receive a task command containing (i) a task identifier, and (ii) a target one of the sub-region identifiers identifying a target one of the sub-regions;
a navigation controller configured to retrieve, from the memory, a selected one of the parametric path definition identifiers that corresponds to the target sub-region identifier;
a parametric path generator configured to obtain a selected one of a plurality of parametric path definitions that corresponds to the selected parametric path definition identifier, the selected parametric path definition including a shape parameter and a reference parameter name;
the parametric path generator further configured to obtain a reference parameter value corresponding to the reference parameter name, and generate a sequence of mobile automation apparatus poses according to the parametric path definition, each pose corresponding to a location in the facility; and
a local planner configured to control a locomotive assembly of the mobile automation apparatus to traverse the target sub-region according to the sequence of poses.

12. The computing device of claim 11, the memory further storing the plurality of parametric path definitions; wherein the parametric path generator is configured to obtain the selected parametric path definition by retrieving the selected parametric path definition from the memory.

13. The computing device of claim 11, wherein the parametric path generator is configured to obtain the selected parametric path definition by: transmitting a request containing the selected parametric path definition identifier to a control server; and receiving the selected parametric path definition responsive to the request.

14. The computing device of claim 11, wherein: the navigation controller is configured to monitor for an updated reference parameter value; and the parametric path generator is configured, responsive to detection of the updated reference parameter value, to generate an updated sequence of mobile automation apparatus poses according to the parametric path definition.

15. The computing device of claim 11, wherein the navigation controller is further configured to: obtain a selected one of a plurality of progress indicator definitions that corresponds to the selected parametric path definition identifier; and during the controlling of the locomotive assembly to traverse the target sub-region according to the sequence of poses, generate a progress indicator according to the selected progress indicator definition.

16. The computing device of claim 11, wherein the navigation controller is further configured, responsive to generation of the sequence of mobile automation apparatus poses, to: obtain a current location of the mobile automation apparatus; initiate generation of an auxiliary path from the current location to an initial one of the sequence of poses, according to a cost function; and prior to controlling the locomotive assembly to traverse the target sub-region, control the locomotion assembly to traverse the auxiliary path.

17. The computing device of claim 11, wherein the reference parameter defines an operational constraint relative to an object in the target sub-region.

18. The computing device of claim 17, wherein the object includes a shelf module, and wherein the reference parameter includes a distance to the shelf module.

19. The computing device of claim 17, wherein the parametric path generator is configured to obtain the reference parameter value by: receiving sensor data at the mobile automation apparatus; and generating the reference parameter based on the sensor data.

20. The computing device of claim 17, wherein the reference parameter value is included in the task command.

* * * * *